(12) United States Patent
Prabhudharwadkar et al.

(10) Patent No.: US 12,467,406 B2
(45) Date of Patent: Nov. 11, 2025

(54) WASTE HEAT RECOVERY SYSTEM

(71) Applicant: KING ABDULLAH UNIVERSITY OF SCIENCE AND TECHNOLOGY, Thuwal (SA)

(72) Inventors: Deoras Mukund Prabhudharwadkar, Thuwal (SA); William L. Roberts, Thuwal (SA); Robert Woodrow Dibble, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 18/030,091

(22) PCT Filed: Oct. 6, 2021

(86) PCT No.: PCT/IB2021/059152
§ 371 (c)(1),
(2) Date: Apr. 4, 2023

(87) PCT Pub. No.: WO2022/074574
PCT Pub. Date: Apr. 14, 2022

(65) Prior Publication Data
US 2023/0366350 A1    Nov. 16, 2023

Related U.S. Application Data

(60) Provisional application No. 63/088,005, filed on Oct. 6, 2020.

(51) Int. Cl.
*B01D 53/14* (2006.01)
*F01K 7/32* (2006.01)
(Continued)

(52) U.S. Cl.
CPC ............ *F02C 6/16* (2013.01); *B01D 53/1475* (2013.01); *F01K 7/32* (2013.01); *F01K 23/10* (2013.01);
(Continued)

(58) Field of Classification Search
None
See application file for complete search history.

(56) References Cited

U.S. PATENT DOCUMENTS 8,303,696 B2    11/2012  Vimalchand et al.
8,459,030 B2 *   6/2013  Finkenrath ............. F01K 25/10
                                                             60/671

(Continued)

FOREIGN PATENT DOCUMENTS

CN    109224654 A    1/2019
CN      1412280 A    4/2023
(Continued)

OTHER PUBLICATIONS

Search Report and Written Opinion received in PCT Application No. PCT/IB2021/059152 mailed Jan. 7, 2022.
(Continued)

*Primary Examiner* — Jason H Duger
(74) *Attorney, Agent, or Firm* — Ajay A. Jagtiani; Miles & Stockbridge P.C.

(57) ABSTRACT

A powered system is disclosed including a power block, an exhaust system configured to receive exhaust gas from the power block, a carbon capture system and a heat recovery system. The exhaust system is configured to couple the carbon capture system to the power block. The carbon capture system is configured to extract $CO_2$ from the exhaust gas. The heat recovery system is configured to receive the extracted $CO_2$ from the carbon capture system for providing heat energy to and from the power plant system.

6 Claims, 5 Drawing Sheets

(51) Int. Cl.
*F01K 23/10* (2006.01)
*F01K 25/10* (2006.01)
*F02C 1/08* (2006.01)
*F02C 1/10* (2006.01)
*F02C 3/30* (2006.01)
*F02C 3/34* (2006.01)
*F02C 6/16* (2006.01)
*F02C 6/18* (2006.01)
*F02C 7/08* (2006.01)
*F28D 20/00* (2006.01)

(52) U.S. Cl.
CPC ............ *F01K 25/10* (2013.01); *F01K 25/103* (2013.01); *F02C 1/08* (2013.01); *F02C 1/10* (2013.01); *F02C 3/30* (2013.01); *F02C 3/34* (2013.01); *F02C 6/18* (2013.01); *F02C 7/08* (2013.01); *F28D 20/00* (2013.01); *B01D 2257/504* (2013.01); *F05D 2260/61* (2013.01)

(56) References Cited

U.S. PATENT DOCUMENTS

| | | | |
|---|---|---|---|
| 8,647,420 | B2 | 2/2014 | Tsubone et al. |
| 9,856,755 | B2 | 1/2018 | Drouvot et al. |
| 10,537,828 | B2 | 1/2020 | Baxter et al. |
| 2007/0051667 | A1 | 3/2007 | Martinie et al. |
| 2008/0127632 | A1 | 6/2008 | Finkenrath et al. |
| 2008/0173571 | A1 | 7/2008 | Yen et al. |
| 2009/0236266 | A1 | 9/2009 | Cheng |
| 2010/0024421 | A1* | 2/2010 | Litwin ............... F02C 1/05 60/641.8 |
| 2010/0162703 | A1 | 7/2010 | Li et al. |
| 2011/0065969 | A1 | 3/2011 | Chan et al. |
| 2011/0315600 | A1 | 12/2011 | Choi et al. |
| 2012/0073300 | A1* | 3/2012 | Ziminsky ............ F23R 3/16 60/746 |
| 2012/0319410 | A1* | 12/2012 | Ambrosek ............ F02C 6/10 290/1 R |
| 2013/0062883 | A1 | 3/2013 | Kaneeda et al. |
| 2013/0133326 | A1 | 5/2013 | Jonsson et al. |
| 2014/0020388 | A1* | 1/2014 | Salazar ............... F01K 23/10 60/689 |
| 2017/0058712 | A1* | 3/2017 | Allam ............... F25J 3/04133 |
| 2017/0183996 | A1* | 6/2017 | Baker ............... F01K 5/00 |
| 2021/0002562 | A1 | 1/2021 | Pereira Almao et al. |

FOREIGN PATENT DOCUMENTS

| | | | |
|---|---|---|---|
| EP | 0 723 646 | B1 | 1/2000 |
| EP | 2 455 591 | A2 | 5/2012 |
| JP | 2002-320815 | A | 11/2002 |
| JP | 2005-28216 | A | 2/2005 |
| KR | 10-1596014 | B1 | 2/2016 |
| WO | WO-9502115 | A1 * | 1/1995 ............ F01K 23/02 |
| WO | 02/26916 | A1 | 4/2002 |
| WO | 2006/043820 | A1 | 4/2006 |
| WO | 2012/127504 | A2 | 9/2012 |
| WO | 2012/164370 | A1 | 12/2012 |

OTHER PUBLICATIONS https://www.rivieramm.com/opinion/opinion/could-onboard-carbon-capture-really-work-55436.
https://www.shell.com/business-customers/catalysts-technologies/licensed-technologies/emissions-standards/tail-gas-treatment-unit/cansolv-co2.html.
https://www.greenbiz.com/article/potential-carbon-capture-tech-captivating.
Examination Report received in Saudi Arabian Application No. 523440282 dated Oct. 16, 2023.
International Search Report and Written Opinion received in PCT Application No. PCT/IB2022/054150 dated Aug. 26, 2022.
International Search Report and Written Opinion received in PCT Application No. PCT/IB2022/054149 dated Aug. 26, 2022.
International Search Report and Written Opinion received in PCT Application No. PCT/IB2022/054148 dated Aug. 26, 2022.
International Search Report and Written Opinion received in PCT Application No. PCT/IB2022/051914 dated Jun. 13, 2022.
Ponce et al., "Modeling of Sulfur Removal from Heavy Fuel Oil Using Ultrasound-Assisted Oxidative Desulfurization", King Abdullah University of Science and Technology, PhD Thesis, pp. 1-65 (2020).
Jongbok et al., "Sonochemical Effects using Multi-stepped Ultrasonic Horn", J. Soil Groundwater Environ., vol. 25 (4), pp. 58-66 (2020).
Notification of the Substantive Examination Report received in Saudi Arabian Application No. 523440282 mailed Jul. 10, 2024.

* cited by examiner

WASTE HEAT RECOVERY SYSTEM

This application claims benefit of priority of U.S. Patent Application No. 63/088,005, entitled, "WASTE HEAT RECOVERY SYSTEM USING THE CARBON DIOXIDE CAPTURED FROM THE FLUE GAS EXHAUST" filed Oct. 6, 2020. The entire contents and disclosures of this patent application is incorporated herein by reference in its entirety.

BACKGROUND

Field of the Invention

The present disclosure relates generally to reducing and eliminating waste generated in carbonaceous fuel systems. More particularly, the present disclosure relates to a method and device for capturing $CO_2$ from fuel exhaust streams and extracting heat to provide continuous power generation.

BACKGROUND OF THE INVENTION

Systems burning fuels from carbonaceous materials generate large amounts of flue gas. Carbon capture technologies have been developed to remove $CO_2$ from the flue gas. There remains strong interest in not only acquiring $CO_2$ from exhaust gas streams but utilizing the same for sequestration and other purposes.

SUMMARY

According to first broad aspect, the present disclosure provides a powered system comprising: a power block; an exhaust system configured to receive exhaust gas from the power block; a carbon capture system, wherein the exhaust system is configured to couple the carbon capture system to the power block, wherein the carbon capture system is configured to extract $CO_2$ from the exhaust gas; and a heat recovery system, wherein the heat recovery system is configured to receive the extracted $CO_2$ from the carbon capture system for providing heat energy to and from the power plant system.

According to a second broad aspect, the present disclosure provides a method of providing continuous power generation in a powered system comprising: capturing a liquid medium from an exhaust gas of an exhaust system of a power block; recovering heat from the captured liquid medium; recirculating the captured liquid medium back to the exhaust system to superheat the captured liquid medium thereby forming a superheated medium; and harnessing the energy of the superheated medium to provide power to powered system, supply power external to the system or supply power to a storage device.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION OF THE INVENTION

Definitions

Figure 1:
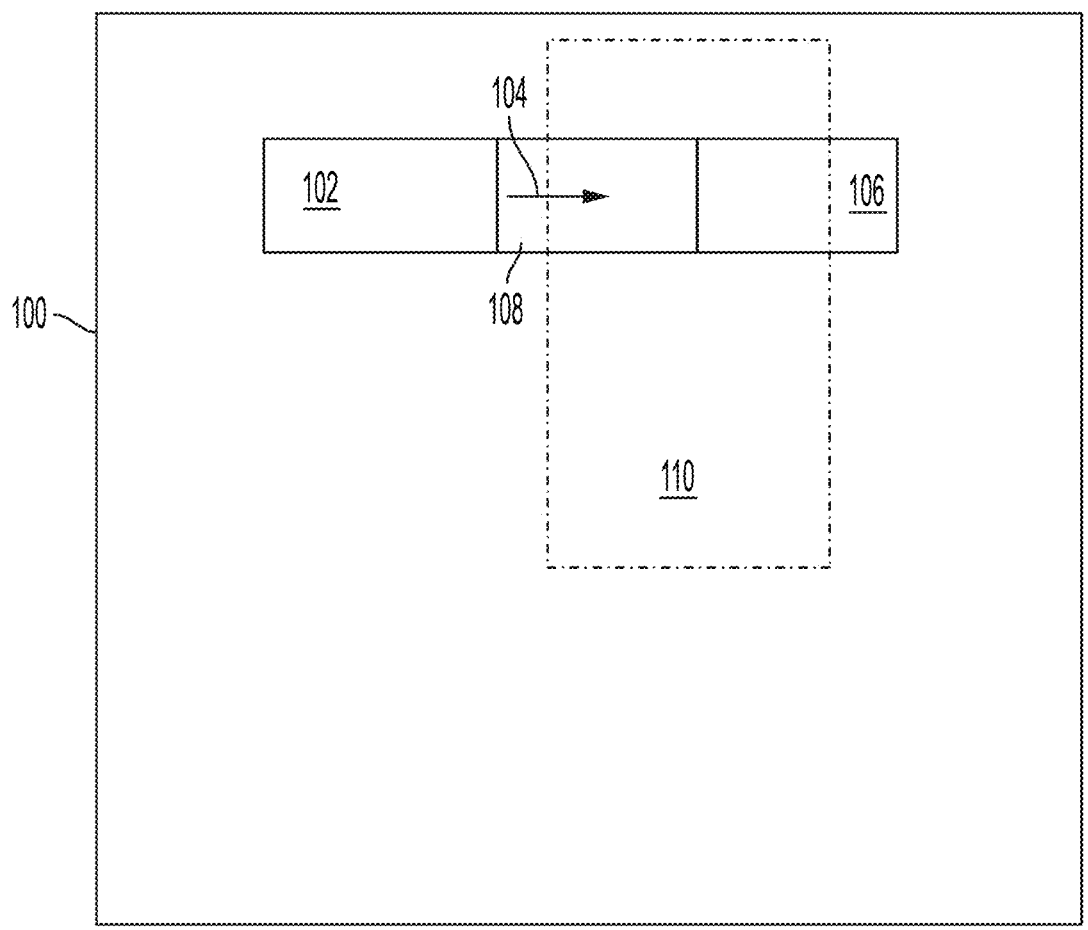
FIG. 1 is a schematic illustrating a modular design of an exemplary powered system according to one embodiment of the present disclosure.

Where the definition of terms departs from the commonly used meaning of the term, applicant intends to utilize the definitions provided below, unless specifically indicated.

It is to be understood that the foregoing general description and the following detailed description are exemplary and explanatory only and are not restrictive of any subject matter claimed. In this application, the use of the singular includes the plural unless specifically stated otherwise. It must be noted that, as used in the specification and the appended claims, the singular forms "a," "an" and "the" include plural referents unless the context clearly dictates otherwise. In this application, the use of "or" means "and/or" unless stated otherwise. Furthermore, use of the term "including" as well as other forms, such as "include", "includes," and "included," is not limiting.

For purposes of the present disclosure, the term "comprising", the term "having", the term "including," and variations of these words are intended to be open-ended and mean that there may be additional elements other than the listed elements.

For purposes of the present disclosure, directional terms such as "top," "bottom," "upper," "lower," "above," "below," "left," "right," "horizontal," "vertical," "up," "down," etc., are used merely for convenience in describing the various embodiments of the present disclosure. The embodiments of the present disclosure may be oriented in various ways. For example, the diagrams, apparatuses, etc., shown in the drawing figures may be flipped over, rotated by 90° in any direction, reversed, etc.

For purposes of the present disclosure, a value or property is "based" on a particular value, property, the satisfaction of a condition, or other factor, if that value is derived by performing a mathematical calculation or logical decision using that value, property or other factor.

For purposes of the present disclosure, it should be noted that to provide a more concise description, some of the quantitative expressions given herein are not qualified with the term "about." It is understood that whether the term "about" is used explicitly or not, every quantity given herein is meant to refer to the actual given value, and it is also meant to refer to the approximation to such given value that would reasonably be inferred based on the ordinary skill in the art, including approximations due to the experimental and/or measurement conditions for such given value.

For purposes of the present disclosure, the term "amine" as it pertains to organic chemistry refers to compounds and functional groups that contain a basic nitrogen atom with a lone pair. Amines are formally derivatives of ammonia, wherein one or more hydrogen atoms have been replaced by a substituent such as an alkyl or aryl group.

For purposes of the present disclosure, the term "carbon dioxide" (chemical formula $CO_2$) refers to an acidic colorless gas with a density about 53% higher than that of dry air. Carbon dioxide molecules consist of a carbon atom covalently double bonded to two oxygen atoms.

For purposes of the present disclosure, the term "expander" refers to a machine (e.g., a rotating machine) with an expansion turbine that converts the energy contained in a gas into mechanical work, much like a steam or gas turbine. (For purposes of the present disclosure, the term "expander" may also refer to a turboexpander, also referred to as a turbo-expander or an expansion turbine.) In some disclosed embodiments, the expander may expand a gas stream for its own sake to generate mechanical work. Thus, in some disclosed applications, expander may be regarded as a centrifugal or axial-flow turbine, through which a high-pressure gas is expanded to produce work that may be utilized to drive a work component such as a compressor or generator.

For purposes of the present disclosure, the term "recuperator" refers to a counter-flow energy recovery heat exchanger positioned within the supply and/or exhaust air streams of an air handling system, or in the exhaust gases of an industrial process, in order to recover the waste heat. It may be utilized to extract heat from the exhaust and use it to preheat air entering a combustion system to utilize waste energy to heat the air, offsetting some of the fuel, and thereby improve the energy efficiency of the system as a whole. In some embodiments, a recuperator may refer to a heat exchanger that transfers unspent energy from a hot fluid (e.g., $CO_2$ in the disclosed invention) to preheat a cold fluid directed to a waste heat recovery system.

For purposes of the present disclosure, the term "$sCO_2$" refers to supercritical carbon dioxide ($CO_2$) which is a fluid state of carbon dioxide where it is held at or above its critical temperature and critical pressure. Carbon dioxide usually behaves as a gas in air at standard temperature and pressure (STP), or as a solid called dry ice when frozen. If the temperature and pressure are both increased from STP to be at or above the critical point for carbon dioxide, it can adopt properties midway between a gas and a liquid.

For purposes of the present disclosure, the term "supercritical fluid (SCF)" refers to any substance at a temperature and pressure above its critical point, where distinct liquid and gas phases do not exist, but below the pressure required to compress it into a solid. It can effuse through porous solids like a gas, overcoming the mass transfer limitations that slow liquid transport through such materials. SCF may be regarded as much superior to gases in their ability to dissolve materials like liquids or solids. In addition, close to the critical point, small changes in pressure or temperature result in large changes in density, allowing many properties of a supercritical fluid to be "fine-tuned."

Description

While the invention is susceptible to various modifications and alternative forms, specific embodiment thereof has been shown by way of example in the drawings and will be described in detail below. It should be understood, however that it is not intended to limit the invention to the particular forms disclosed, but on the contrary, the invention is to cover all modifications, equivalents, and alternatives falling within the spirit and the scope of the invention.

Carbon capture technologies are being developed to separate carbon dioxide from the flue gases in the exhaust of power plants such as those powered by coal, oil or gas. In some systems, $CO_2$ may be removed and subsequently transported such as to a storage or utilization facility.

Some conventional designs may provide limited carbon capture capability and are hereby incorporated herein by reference in their entirety. For example, Toshiba Energy Systems and Solutions Corporation provides thermal power generation technologies to flue gas steams. Some embodiments provide a power block working on a boiler and a carbon capture system based on amines system. However, this system does not utilize captured $CO_2$ to recover heat or generate power output, as in the disclosed invention, which makes use of captured $CO_2$ as a heat recovery fluid for thermal storage/power generation.

Another study uses amines which may be based upon a carbon capture system. However, the system is limited in that it merely provides a $CO_2$ liquifaction unit but does not have a $CO_2$ based heat recovery/power generation system. Thus, this conventional system does not utilize captured $CO_2$ to recover heat or generate power output as in the disclosed invention which makes use of captured $CO_2$ as a heat recovery fluid for thermal storage/power generation.

The Shell CANSOLV® $CO_2$ capture system also uses amine to capture $CO_2$ which may be based upon a carbon capture system. However, the Shell CANSOLV® $CO_2$ capture system does not disclose captured $CO_2$ to recover heat or generate power output, as in the disclosed invention, which makes use of captured $CO_2$ as a heat recovery fluid for thermal storage/power generation.

In one IECS mockup, an article contemplates an innovative carbon capture system based on low temperature separation. The discussion recognizes that while carbon dioxide ($CO_2$) from fossil-fueled power plants can be captured, current options for doing so are expensive, present operational challenges for the rest of the plant, and are difficult to initiate and complete. It is observed that such discussions, however, fail to mention use of captured $CO_2$ to recover heat or generate power output, as in the disclosed invention, which makes use of captured $CO_2$ as a heat recovery fluid for thermal storage/power generation.

In a direct air capture (DAC) system, the prior art only provides $CO_2$ capture systems. For example, there is no flue gas source such as a power block, and there is no provision additional components such as a $CO_2$ driven power generation system. Thus, such conventional DAC systems do not provide the same configuration of the disclosed embodiments and also provide fundamentally different applications from the disclosed invention.

Turning to US patent application publication no. US 2010/0162703 A1, a process is disclosed for reducing $CO_2$ emission in a power plant, wherein the power plant comprises at least one gas turbine coupled to a heat recovery steam generator unit and the $CO_2$ capture unit comprises an absorber and a regenerator. While the system incorporates a gas turbine, a carbon capture system and a heat recovery system, the heat recovery system is based on steam. In contrast, disclosed embodiments make use of captured $CO_2$ as a heat recovery fluid for thermal storage/power generation.

U.S. Pat. No. 9,856,755 B2 is directed to thermal integration of a carbon dioxide capture and compression unit with a steam or combined cycle plant. A carbon capture and compression system and a power plant cooling system is disclosed. U.S. Pat. No. 9,856,755 B2 utilizes the heat generated in the $CO_2$ compression process to improve efficiency of the plant and the capture system. However, the disclosed provides an overall improvement in system efficiency. Furthermore, disclosed embodiments may perform at lower temperatures, which has lower improvement potential. Heat recovery in some prior art systems may merely utilize $CO_2$ in a compression process. Whereas, the disclosed system provides embodiments that utilize $sCO_2$ to extract heat from a much higher temperature source. Accordingly, the disclosed $sCO_2$ system has efficiencies higher than the traditional steam cycle at the same heat input conditions. Thus, the disclosed $sCO_2$ system works at much higher temperatures and hence efficiencies.

WO2012164370A1 provides $CO_2$ capture with carbonate looping. This system has a power plant, a carbon capture system and a heat exchange system. While WO2012164370A1 refers to coupling of the specific carbon capture method (carbonate looping) with the power plant, there is no use of captured $CO_2$ for heat recovery or a power generation process.

U.S. Pat. No. 8,647,420 B2 discloses a system and method for recovering carbon dioxide from flue gas in which it refers to the design of carbon capture equipment. However the disclosed design of U.S. Pat. No. 8,647,420 B2 is limited only to the carbon capture system. In contrast, the present disclosure contemplates a system integration where carbon capture is combined with $CO_2$ utilization for power generation.

U.S. Pat. No. 8,303,696 B2 is directed to a carbon dioxide absorber and regeneration assemblies useful for power plant flue gas. The disclosure discusses an apparatus and method to treat large amounts of flue gas from a pulverized coal combustion power plant. While U.S. Pat. No. 8,303,696 B2 refers to internal improvements of the carbon capture process, it is limited only to the carbon capture system. In contrast, the present disclosure contemplates a system integration where carbon capture is combined with $CO_2$ utilization for power generation.

Finally, US patent application publication no. US 2008/0127632 A1 refers to carbon dioxide capture systems and methods. A carbon dioxide separation system includes a compressor for receiving an exhaust gas comprising $CO_2$ and generate a compressed exhaust gas and a separator configured to receive the compressed exhaust gas and generate a $CO_2$ lean stream. Even though US 2008/0127632 A1 makes reference to a power plant, a carbon capture system and a heat exchange system, it does not use captured $CO_2$ for power generation. The disclosed system works on pumping of the separated $CO_2$ only, which results in a much less pumping energy requirement.

An exemplary power system may comprise a network consisting of a generation, distribution and transmission system. It may utilize a form of energy such as a power block (e.g., coal fired boiler, oil fired boiler, diesel, etc.) in a power plant and convert it into electrical energy. The power system may also include additional devices connected to the system such as one or more generators, motors, transformers, circuit breakers, conductors, etc.

Additional equipment, such as carbon capture systems may also be implemented within the power plant. Carbon capture is an energy intensive process and adds a parasitic load on the power plant. Disclosed embodiments provide the integration of a carbon capture system/process with a power block (such as a gas turbine power plant) in a simple cycle or combined cycle to improve an overall process performance and reduce any parasitic load. Given the limitations of the aforementioned conventional systems, the proposed disclosure captures $CO_2$ and subsequently transports the $CO_2$ in liquid form to a storage or utilization facility. Disclosed embodiments provide a heat recovery system to process the captured $CO_2$ and reintegrate the captured $CO_2$ within the power plant for further processing. FIG. 1 illustrates one exemplary embodiment of a powered system 100 (such as a power plant) having a power block 102. The power block 102 may be any system that produces power (e.g., coal fired boiler, oil fired boiler, diesel, etc.) and generates exhaust gas 104. In one preferred embodiment, power block 102 is a power producing system that generates hot exhaust 104 containing $CO_2$. Thus, embodiments of power block 102 may comprise a gas turbine (burning, for example, natural gas or any other liquid fuel) or a coal plant, etc.

A carbon capture system 106 may be coupled to power block 102 to extract $CO_2$ from expelled exhaust gases 104 such as through an exhaust system 108 of the power block 102. A heat recovery system 110 may be configured within the power plant 100 to utilize the captured $CO_2$ from the expelled exhaust gases 104 and reintroduce the same back into the system of power plant 100 in accordance with various configurations and processes as disclosed herein. In this manner, the efficiency of power plant 100 is enhanced in a variety of manners including by: extracting the heat using the captured $CO_2$ to reduce or eliminate otherwise generated waste heat, powering systems of power plant 100 or other equipment through the energy harnessed by the captured $CO_2$, directly supplying energy to a power grid and providing energy storage for off-peak time periods and/or for on-demand dispatch.

Thus, in accordance with disclosed embodiments, a configuration of the disclosed heat recovery system 110 allows captured $CO_2$ to be pumped to back to exhaust system 108 through a heat exchanger to extract the heat and cool the flue gases. Furthermore, the heat exchanger may be directly inserted in the exhaust flue gas path or connected to a thermal storage. The hot pressurized $CO_2$ may also be expanded, such as through a turboexpander, to generate electrical power or provide mechanical energy to the equipment in the power plant. The electrical output from the turboexpander may be transported to a grid or can be stored, for example, in a battery for later use. Accordingly, disclosed embodiments provide the use of captured $CO_2$ to extract the heat to thereby reduce or eliminate otherwise generated waste from power plant 100. Exemplary embodiments of the disclosed invention are further described below.

Figure 2:
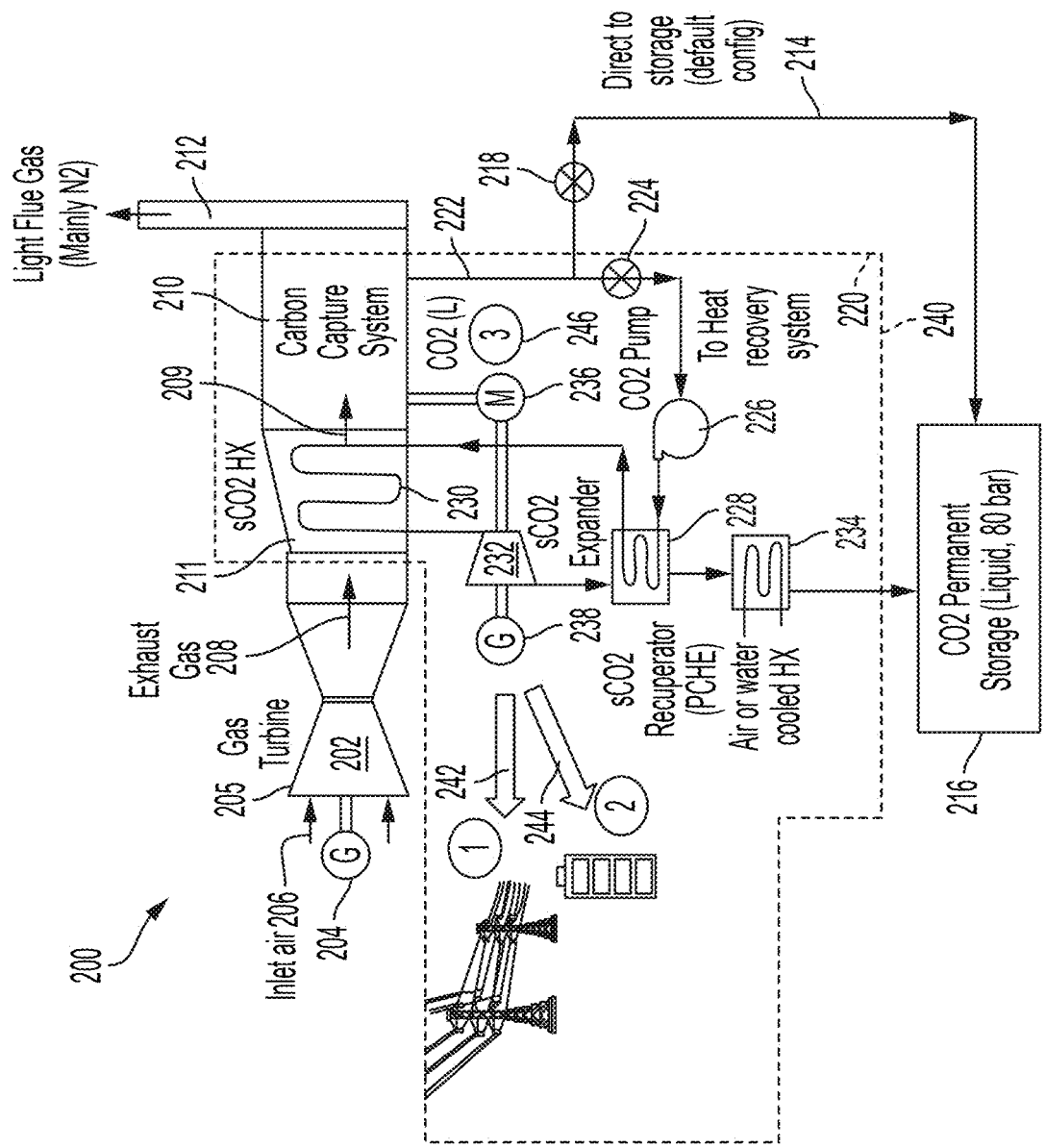
FIG. 2 illustrates an exemplary carbon capture and heat recovery system according to one embodiment of the present disclosure.

FIG. 2 illustrates an exemplary carbon capture and heat recovery system 200 having a gas turbine plant integration according to one embodiment of the present disclosure. The disclosed embodiment may be regarded as a simple cycle plant. In this embodiment, a gas turbine 202 serves as the power block. Gas turbine 202 may power a generator 204 and include a gas turbine compressor 205 for receiving an air inlet 206. While only one gas turbine 202 is illustrated, it is readily appreciate that one or more gas turbines 202 may be connected and utilized with the disclosed embodiments. Gas exhaust 208 is expelled from gas turbine 202 whereupon it may be collected and treated by a carbon capture system 210 having a flue exhaust stack 212. An exhaust system 211 may be utilized to couple carbon capture system 210 to gas turbine 202 for receiving exhaust gas 209 into carbon capture system 210. Captured $CO_2$ may be expelled from carbon capture system 210 through a conduit 214 and collected at a permanent storage 216. Permanent storage 216 may service as a $CO_2$ storage or usage facility. In one preferred embodiment, the captured $CO_2$ is in liquid form. A value 218 may be utilized to control the flow of captured $CO_2$ through conduit 214. Valve 218 may remain closed when $CO_2$ is diverted to a heat recovery system 220.

Disclosed embodiments provide a heat recovery system 220 which may utilize elements of the power plant in addition to other disclosed configurations incorporating additional equipment. For example, in one embodiment, heat recovery system 220 may incorporate carbon capture system 210 to obtain captured $CO_2$ via conduit 222. Again, preferred embodiments of the captured $CO_2$ is in liquid form as it is incorporated into heat recovery system 220. A valve 224 may be utilized to control the flow of captured $CO_2$ through conduit 222. Heat recovery system 220 provides a $CO_2$ pump 226 in connection with a recuperator 228. In an exemplary embodiment, recuperator 228 may comprise a printed circuit heat exchanger (PCHE). Recuperator 228 may be configured in connection with an exhaust heat recovery heat exchanger 230. Exhaust heat recovery heat exchanger 230 may be disposed within exhaust system 211. This location facilitates achieving supercritical $CO_2$ ($sCO_2$) via exhaust heat recovery heat exchanger 230. Exhaust heat recovery heat exchanger 230 may be configured in further connection to turboexpander 232. Turboexpander 232 may be configured to motor driving equipment 236, for example, in the carbon capture system 210. Turboexpander 232 may also be configured to a generator 238. In the disclosed embodiment, turboexpander 232 is connected back to recuperator 228 which may be further connected to heat exchanger 234. In some disclosed embodiments, heat exchanger 234 may be air or water cooled. Heat exchanger 234 may be coupled back to permanent storage 216. It is noted that each of the connections, for example, between various elements in the power plant including $CO_2$ pump 226, recuperator 228, exhaust heat recovery heat exchanger 230, turboexpander 232, heat exchanger 234 and permanent storage 216 may utilize similar conduit materials 214, 222 appropriate for delivering liquid $CO_2$ and supercritical $CO_2$ ($sCO_2$) at varying temperatures to respective devices. In addition, one, more or all connections may be fluid connection types.

Thus, a system boundary 240 is shown to illustrate heat recovery system 220 comprising carbon capture system and $sCO_2$ heat recovery to power system. In operation, $CO_2$ may be dispensed from carbon capture system 210 preferably in liquid form. Valve 218 remains closed and valve 224 remains open when $CO_2$ is diverted to heat recovery system 220. In one disclosed embodiment, $CO_2$ may be pumped, for example, to approximately 200-250 bar and heated in the exhaust stream 208 of gas turbine 202 to turn it supercritical and expanded through supercritical $CO_2$ ($sCO_2$) turboexpander 232. Turboexpander 232 may provide power/energy in, at least, the following ways (as shown): 1) direct output to a power grid 242; 2) stored in a rechargeable power storage unit such as in a battery (power to battery storage 244) at off-peak time periods for on-demand dispatch (e.g., blackout event); 3) power to motor 236, i.e., driving auxiliary equipment 246 in the carbon capture process and/or other equipment in the plant (e.g., pumps, compressors, refrigeration and/or electrical systems, etc.) and to carbon capture system 210 itself. The expanded $CO_2$ (e.g., at 232) may be cooled (e.g., at 234) and sent to permanent storage 216 and/or a utilization facility.

Figure 3:
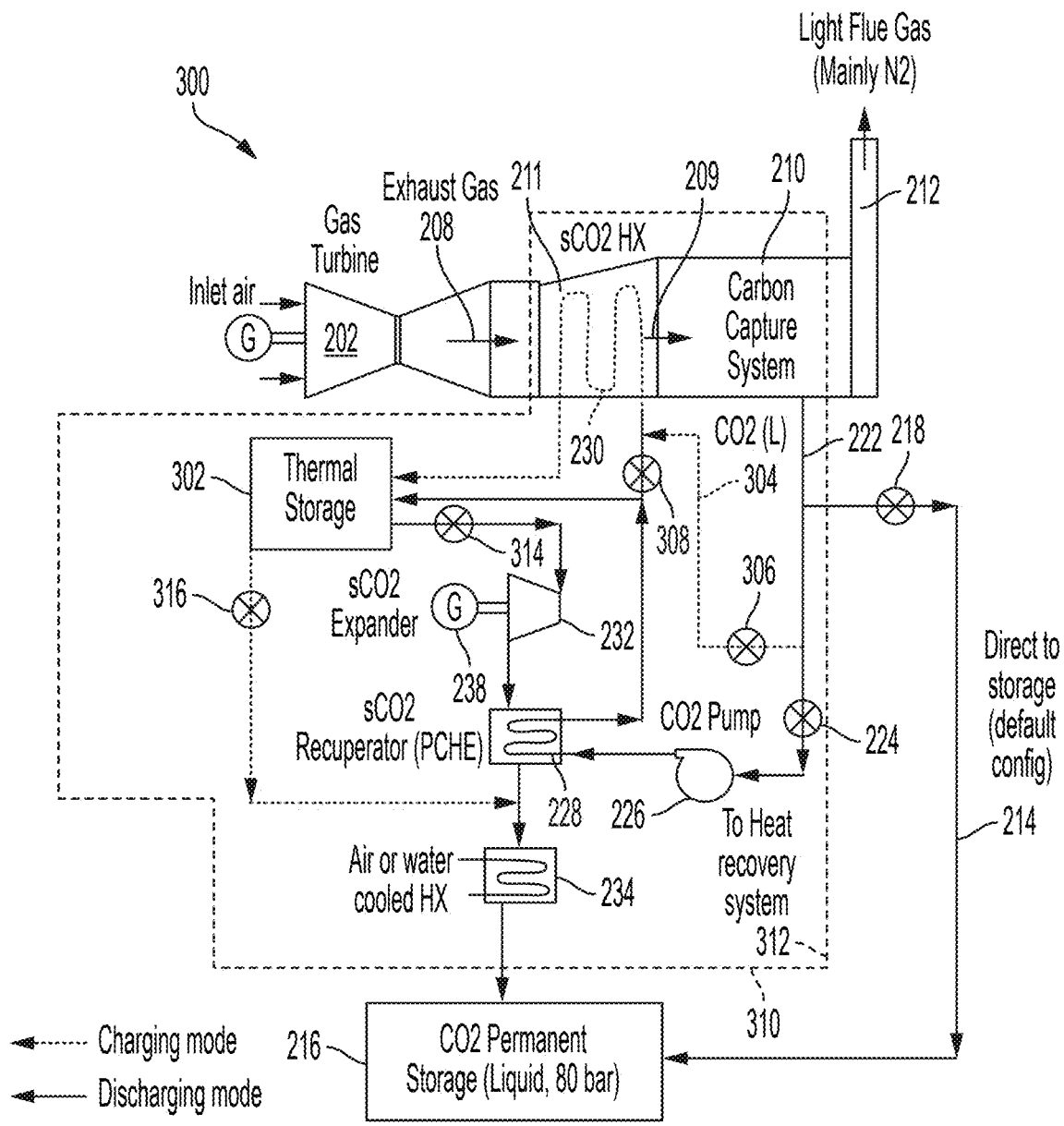
FIG. 3 illustrates an exemplary carbon capture and heat recovery system according to another embodiment of the present disclosure.

FIG. 3 illustrates another exemplary carbon capture and heat recovery system 300 having a gas turbine plant integration according to one embodiment of the present disclosure. The disclosed embodiment may be regarded as a simple cycle plant. The configuration of carbon capture system 210 coupled to gas turbine 202 via exhaust system 211 may remain the same as in the embodiment of FIG. 2. Captured $CO_2$ may be expelled from carbon capture system 210 through a conduit 214 and collected at a permanent storage 216. In a preferred embodiment, the captured $CO_2$ is in liquid form. Value 218 may be utilized to control the flow of captured $CO_2$ through conduit 214. Valve 218 may remain closed when $CO_2$ is diverted to a heat recovery system 220.

The disclosed heat recovery system 312 may utilize elements of the power plant in addition to other disclosed configurations incorporating additional equipment. For example, in one embodiment, heat recovery system 220 may incorporate carbon capture system 210 to obtain captured $CO_2$ via conduit 222. Again, preferred embodiments of the captured $CO_2$ is in liquid form as it is incorporated into heat recovery system 312.

As in the embodiment of FIG. 2, captured $CO_2$ may be delivered from carbon capture system 210 directly to $CO_2$ pump 226. Valve 224 may be utilized to control the flow of captured $CO_2$ through conduit 222 connecting carbon capture system 210 to $CO_2$ pump 226. Alternatively another conduit 304 may be provided to connect carbon capture system 210 directly to exhaust heat recovery heat exchanger 230. The flow control through conduit 304 may be regulated by selection device such as valve 306. Thus, when valves 218 and 224 are closed and valve 306 is open, captured $CO_2$ flows from carbon capture system 210 to exhaust heat recovery heat exchanger 230. When valves 306 and 218 are closed and valve 224 is open, captured $CO_2$ flows from carbon capture system 210 to $CO_2$ pump 226.

Heat recovery system 312 provides $CO_2$ pump 226 in connection with recuperator 228. As in the embodiment of FIG. 2, recuperator 228 may be configured in connection with exhaust heat recovery heat exchanger 230. Alternatively, recuperator 228 may be configured in connection with a thermal storage 302. Selection of the supply of $CO_2$ to exhaust heat recovery heat exchanger 230 and/or to thermal storage 302 may be performed by a selection device such as valves 224, 306,308, 314 and 316. Thus in an open position of valves 306 and 316 divert $CO_2$ to exhaust heat recovery heat exchanger 230 transferring heat to the thermal storage 302 while valves 224, 308 and 314 are closed. Heat stored in the thermal storage system 302 can be extracted by opening valves 224 and 314 while keeping valves 306 and 316 closed. In this position, $CO_2$ may be pumped directly to thermal storage 302 to become superheated and then be subsequently discharged from thermal storage 302 to produce power as needed. Thermal storage 302 may comprise any appropriate storage medium capable of receiving heat transferred from $CO_2$ or $sCO_2$ at various temperatures including, but limited to, molten salt, sand, rock(s), silicon, concrete, etc.

When $CO_2$ is enabled to flow to exhaust heat recovery heat exchanger 230, supercritical $CO_2$ ($sCO_2$) may be achieved therein such as via exposure to the heat generated from the exhaust gas 208 stream. As illustrated in FIG. 3, exhaust heat recovery heat exchanger 230 may be configured in further connection with thermal storage 302 for $sCO_2$ delivery thereto. Thermal storage 302 may be configured in further connection with turboexpander 232 which may be in connection with generator 238. A selection device such as valve 314 may be utilized to control the flow from thermal storage 302 to turboexpander 232. In the disclosed embodiment, turboexpander 232 is connected back to recuperator 228 which may be further connected to heat exchanger 234. In some disclosed embodiments, heat exchanger 234 may be air or water cooled. Heat exchanger 234 may be coupled back to permanent storage 216. The disclosed configuration also provides thermal storage 302 being configured in further connection with heat exchanger 234. A selection device such as valve 316 may regulate flow from thermal storage 302 to heat exchanger 24. It is noted that each of the connections, for example, between various elements in the power plant including $CO_2$ pump 226, recuperator 228, exhaust heat recovery heat exchanger 230, thermal storage 302, turboexpander 232, heat exchanger 234 and permanent storage 216 may utilize similar conduit materials 214, 222, 304 appropriate for delivering liquid $CO_2$ and supercritical $CO_2$ ($sCO_2$) at varying temperatures to respective devices. In addition, one, more or all connections may be fluid connection types.

Thus, a system boundary 310 is shown to illustrate heat recovery system 312 comprising carbon capture system and $sCO_2$ heat recovery to power system. In operation, $CO_2$ may be dispensed from carbon capture system 210 preferably in liquid form. In the disclosed embodiment, $CO_2$ may be pumped, for example, at approximately 200-250 bar to exhaust heat recovery heat exchanger 230 and heated in the exhaust gas 208 stream of the gas turbine 202 to turn it supercritical. $sCO_2$ may transfer heat from the exhaust gas 208 stream to the thermal storage 302 system during charging mode. During discharging mode, $sCO_2$ may extract heat from thermal storage 302 and run turboexpander 232 thus producing power. The expanded $CO_2$ may be cooled and sent to the permanent storage 216 or utilization facility.

Figure 4:
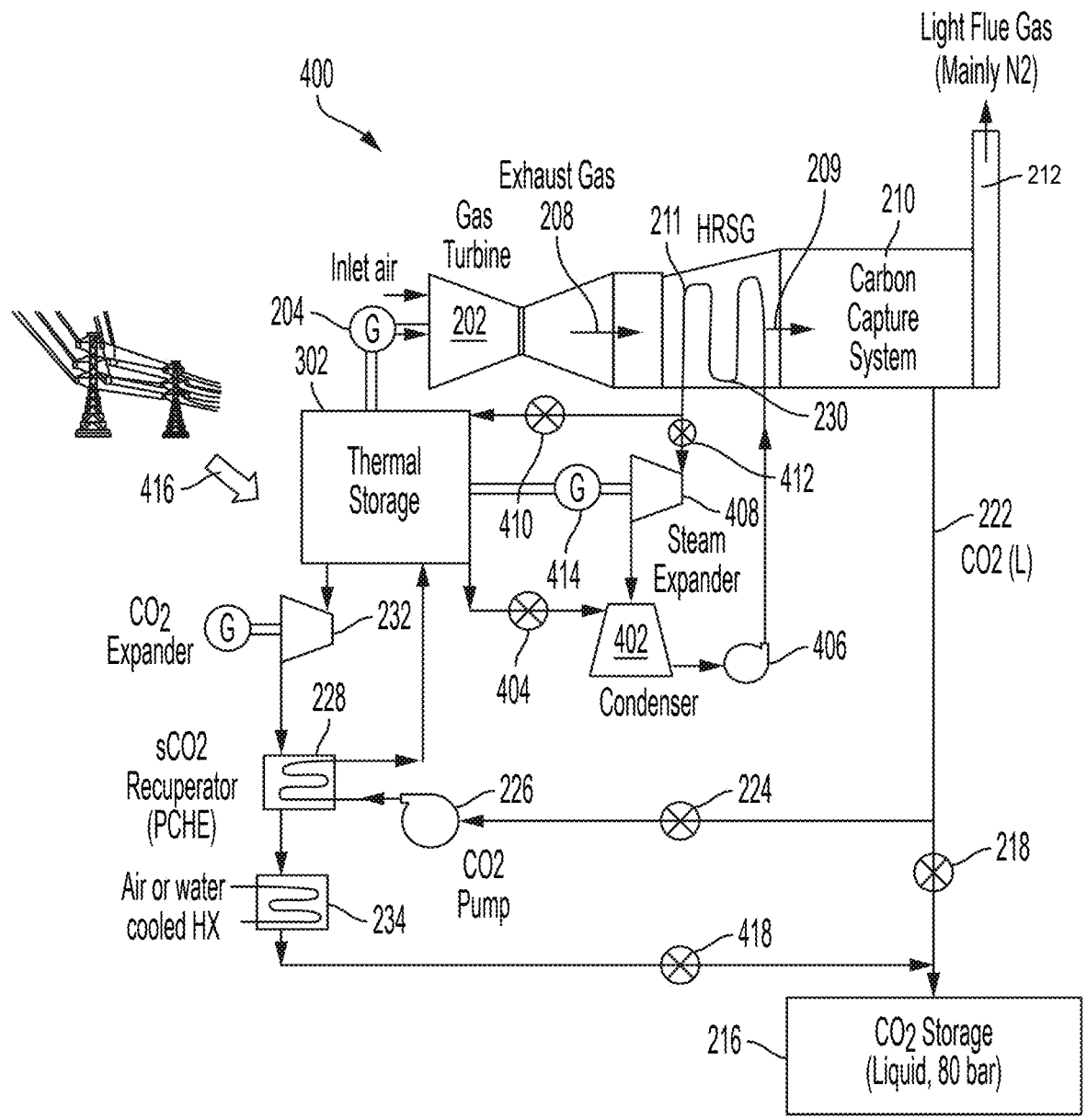
FIG. 4 illustrates an exemplary carbon capture and heat recovery system according to yet another embodiment of the present disclosure.

FIG. 4 illustrates another exemplary carbon capture and heat recovery system 400 having a gas turbine plant integration according to one embodiment of the present disclosure. The configuration of carbon capture system 210 coupled to gas turbine 202 via exhaust system 211 may remain the same as in the embodiment of FIG. 2. The disclosed embodiment may be regarded as a combined cycle plant. In this embodiment, the disclosed heat recovery system may be retrofitted to a pre-configured or existing power system including, for example, a combined cycle plant (e.g., gas turbine and steam cycle system). In the disclosed embodiment, space constraints may be limited on site. According to one disclosed embodiment, a heat extraction or energy design for heat extraction may be regarded as a continuous heat recovery system.

Turning to FIG. 4, captured $CO_2$ may be expelled from carbon capture system 210 through a conduit 222. When valve 224 is closed and valve 218 is open, captured $CO_2$ is permitted to flow to permanent storage 216. In a preferred embodiment, the captured $CO_2$ is in liquid form. When valve 218 is closed, $CO_2$ is diverted to $CO_2$ pump 226. Valve 224 may be utilized to control the flow of captured $CO_2$ through conduit 222 connecting carbon capture system 210 to $CO_2$ pump 226. $CO_2$ pump 226 is in connection with recuperator 228. Recuperator 228 may be configured in connection with thermal storage 302.

Thermal storage 302 is configured to power one or more aspects of the disclosed configuration. To begin with, thermal storage may be configured in connection with a condenser 402. The regulation of flow to condenser 402 may occur via a selection device such as valve 404. Condenser 402 may be configured in connection with a pump 406 which may be further connected to exhaust heat recovery heat exchanger 230.

Exhaust heat recovery heat exchanger 230 may be connected to thermal storage 302 and steam expander 408. Regulation of flow to thermal storage 302 and steam expander 408 may occur by selection devices such as valves 410, 412, respectively. Steam expander 408 may be connected to condenser 402. In addition, thermal storage 302 may be configured to supply power to steam expander 408 via generator 414 or to gas turbine 202 via generator 204.

Even more, thermal storage 302 may be configured to receive power from a power grid 416. In this manner, thermal storage 302 may be charged or receive power from power grid 416 to provide energy as needed. In select embodiments, thermal storage 302 may be configured in connection with turboexpander 232 which may be connected back to recuperator 228. Recuperator 228 may be further connected to heat exchanger 234. Heat exchanger 234 may be configured to be connected back to permanent storage 216. Regulation of flow from heat exchanger 234 may occur through a selection device such as valve 418. It is noted that each of the connections, for example, between various elements in the power plant including $CO_2$ pump 226, recuperator 228, exhaust heat recovery heat exchanger 230, thermal storage 302, turboexpander 232, heat exchanger 234 and permanent storage 216 may utilize similar conduit materials 214, 222, 304 appropriate for delivering liquid $CO_2$ and supercritical $CO_2$ ($sCO_2$) at varying temperatures to respective devices. In addition, one, more or all connections may be fluid connection types.

Advantages provided by the disclosed embodiment of FIG. 4 provide a configuration conducive to providing a continuous heat recovery system. This is proves beneficial such as when the gas turbine combined cycle (GTCC) approaches or is forced below minimum emissions compliant load (MECL) (typically at 40-50%) at low demands, the disclosed configuration may compensate to keep the power plant operating efficiently, for example, by supplying energy to thermal storage 302. This capability is important, for instance in jurisdictions having strict requirements for running at prescribed load levels and regulations for addressing pollutant concerns. Thus, conventional power plants, for example, running below MECL levels may be forced to shut down due to their inability to remain emissions compliant. However, due to the capability of the disclosed embodiment, the thermal storage capability of the disclosed configure allows the system to run at minimum emissions compliance loads. Thus, the disclosed system is capable of providing to the power grid while maintaining emissions compliance standards and, therefore, remaining online. The disclosed embodiment allows the system to run on relatively low power loads by dissipating additional power into heat. Thus, heat is harnessed into power through the use of treating captured $CO_2$ in the disclosed system. According to some disclosed embodiments, the power plant system may provide a 20-30% net power load output while operating at a minimum emissions compliant load (MECL) at 40-50% and still remain online.

The disclosed embodiment is beneficial such as when there is a renewables surplus such as when power is being produced by excessively sunny or breezy weather. In which case, the disclosed configuration may make use of surplus electrical energy to store heat via thermal storage 302 (e.g., molten salt, rock(s), sand, silicon etc.). The disclosed configuration allows for reducing fuel expenditures with options, for example, to run the gas turbine 202 at appropriate levels to still meet demand. Thus, the versatility of the disclosed system is proven for running in tandem with other systems or as a stand-alone capability. Whereas in conventional systems, the gas turbine may be throttled down to produce a lower power output. However, invariably such conventional systems will also lose efficiency as the gas turbine is throttled down. In contrast, embodiments of the disclosed invention may not throttle down the gas turbine; rather, select embodiments maintain the gas turbine 202 at an optimum efficiency/design point as the system utilizes the capability of the thermal storage 302 system.

The versatility of the disclosed system is also demonstrated by the use of heat being transferred and stored directly, bypassing the steam turbine. For combined heat and power (CHP)/Cogen applications, where steam is needed but power cannot be exported, the gas turbine generator can be connected to the electrical heater to storage. Thermal storage 302 acts as a heat source to a bottoming $sCO_2$ cycle during peak demand. Thus, the additional capability of the disclosed design provides that one or more generators 204, 414 may be electrically heated by the thermal storage 302. In some embodiments, heaters may be utilized and embedded within the thermal storage 302 system to resistively heat the thermal storage 302. Surplus power is thereby stored as thermal storage 302 for an established amount of time. When it is desirable to extract power from the disclosed system, one may utilize the captured $CO_2$ as a fluid to capture heat. $CO_2$ is used to recover heat from the thermal storage 302 and, therefore, the disclosed system is capable of running all the time at its optimum point. Indeed, the disclosed system is capable of decoupling the power demand and store output as some other form of energy which may or may not immediately be exported to the power grid. The stored energy is extracted when needed/on-demand from the disclosed stored system.

Having described the many embodiments of the present disclosure in detail, it will be apparent that modifications and variations are possible without departing from the scope of the invention defined in the appended claims. Furthermore, it should be appreciated that all examples in the present disclosure, while illustrating many embodiments of the invention, are provided as non-limiting examples and are, therefore, not to be taken as limiting the various aspects so illustrated.

EXAMPLES

Example 1

$sCO_2$ System Model

Figure 5:
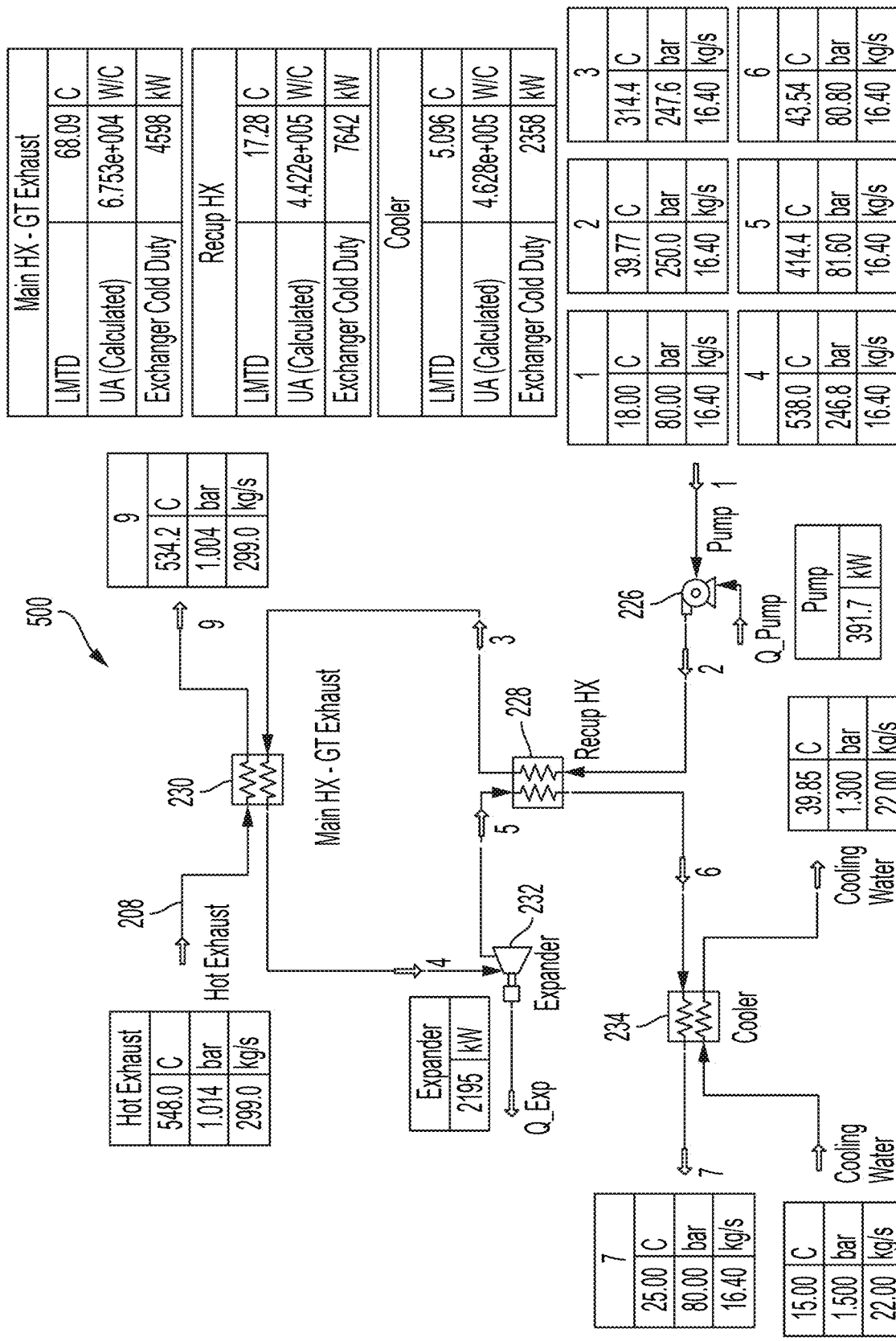
FIG. 5 is schematic $sCO_2$ system model according to one embodiment of the present disclosure.

FIG. 5 illustrates a schematic $sCO_2$ system model 500 in a carbon capture and heat recovery system having a gas turbine plant integration with exemplary data points according to one embodiment of the present disclosure.

Table 1 proves estimates of the component specific costs including non-recoverable-engineering for first-of-a-kind (FOAK) systems. (The uncertainty is estimated to be +/−30%).

TABLE 1

COST MODEL

| Component Description | Cost Units | Component Specific Costs |
|---|---|---|
| Recuperators (cost/UA) | $(kW · th/K) | 2500 |
| Fin Tube Primary Heater (cost/UA) | $(kW · th/K) | 5000 |
| Tube and Shell CO2-Chiller (cost/UA) | $(kW · th/K) | 1700 |
| Turbomachinery + Generator + Motor + Gear + Piping + Skid + I&C + Aux. BOP | $/kWe | 1000 |

Source: Wright et al. sCO2 Symposium, 2016.

In accordance with one disclosed embodiment, an exhaust system for a GE 7E Gas Turbine may assume the following calculations:

| | |
|---|---|
| $sCO_2$ Expander Output: | 2195 kW |
| Pump Input | 391.7 kW |
| Net output | 1803.3 kW |
| Turbo + BOP Cost | $1,803,300 |
| Main HX UA | 67.53 kW/k |
| Main HX Cost | $ 337,650 |
| Recuperator HX UA | 442.8 kW/k |
| Recuperator HX Cost | $1,105,500 |
| Cooler HX UA | 462.8 kW/k |
| Cooler HX Cost | $ 786,760.00 |
| Total Cost | $4,033,210 |
| $/kW | $ 2,237 |

System Level Model shows that for a typical 7E Gas Turbine, the smallest waste heat recovery system can provide up to 1.8 MW power output. This is ~12% of the power consumed by the carbon capture technology.

In accordance with one disclosed embodiment, an exhaust system for a GE 7E Gas Turbine may assume the following calculations:

While the present disclosure has been disclosed with references to certain embodiments, numerous modification, alterations, and changes to the described embodiments are possible without departing from the sphere and scope of the present disclosure, as defined in the appended claims. Accordingly, it is intended that the present disclosure not be limited to the described embodiments, but that it has the full scope defined by the language of the following

What is claimed is:

1. A powered system comprising:
a power block;
an exhaust system configured to receive exhaust gas having an exhaust stream from the power block;
a carbon capture system; and
a heat recovery system,
wherein the exhaust system is configured to couple the carbon capture system to the power block,
wherein the carbon capture system is configured to extract $CO_2$ from the exhaust gas,
wherein the heat recovery system comprises a pump for receiving the extracted $CO_2$, a recuperator in connection with the pump, an exhaust heat recovery heat exchanger and an expander, wherein the extracted $CO_2$ is transferred to the recuperator by the pump, and then to the exhaust heat recovery heat exchanger, wherein the exhaust heat recovery heat exchanger is disposed in the exhaust stream of the exhaust system to heat the extracted $CO_2$ and the extracted $CO_2$ being supercritical $CO_2$ ($sCO_2$) following the exhaust heat recovery exchanger, wherein heat energy is harnessed from the supercritical $CO_2$ ($sCO_2$) by the expander to provide the heat energy to and from the powered system, and
wherein the heat recovery system further comprises:
a thermal storage for receiving the supercritical $CO_2$ ($sCO_2$) from the exhaust heat recovery heat exchanger, where the expander receives heat energy from the thermal storage,
wherein the thermal storage is configured to power the power block and provide and receive energy from the exhaust heat recovery heat exchanger.

2. The system of claim 1, wherein the extracted $CO_2$ is transferred directly to a storage medium or to the heat recovery system.

3. The system of claim 1, wherein the heat recovery system provides continuous power generation to the powered system.

4. The system of claim 1, wherein the recuperator is further configured in connection with the thermal storage.

5. The system of claim 1, wherein the thermal storage is configured in connection with the expander.

6. The system of claim 1, wherein the thermal storage is configured to receive power from a power grid.

\* \* \* \* \*